United States Patent [19]

Eklöf et al.

[11] Patent Number: 4,867,025
[45] Date of Patent: Sep. 19, 1989

[54] CIRCULAR SAW BLADE

[75] Inventors: Mats Eklöf, Fäjestaden; Eje Granlund, Nybro; Gunnar Wikner, Haparanda, all of Sweden

[73] Assignee: GOMEX VERKTYG AB, Kalmar, Sweden

[21] Appl. No.: 404,271

[22] Filed: Aug. 2, 1982

Related U.S. Application Data

[63] Continuation of Ser. No. 209,072, Mar. 28, 1980, abandoned.

[30] Foreign Application Priority Data

Jul. 28, 1978 [IT] Italy ................. 83438 A/78

[51] Int. Cl.[4] ..................... B23D 61/00; B27B 33/08; B28D 1/12
[52] U.S. Cl. ........................................ 83/835; 83/676; 125/15
[58] Field of Search ................... 83/835, 676, 663; 125/15; 76/112, 101 R

[56] References Cited

U.S. PATENT DOCUMENTS

| 3,675,526 | 7/1972 | Bush | 83/676 |
| 3,799,025 | 3/1974 | Tsunoda | 83/835 |
| 3,812,755 | 5/1974 | Danielsen | 83/835 |
| 3,990,338 | 11/1976 | Wikner et al. | 83/835 |

FOREIGN PATENT DOCUMENTS

| 1042874 | 11/1958 | Fed. Rep. of Germany . |
| 771382 | 10/1934 | France . |
| 352270 | 12/1972 | Sweden . |

Primary Examiner—Donald R. Schran
Attorney, Agent, or Firm—Gifford, Groh, Sheridan, Sprinkle and Dolgorukov

[57] ABSTRACT

The invention relates to a circular saw blade of the sandwich-type, i.e. a blade comprising two steel discs (2, 3) on the periphery of which the cutting elements (5) of the blade are attached. In order to improve the vibration and noise damping properties of such blades an intermediate layer (4) of an energy-absorbing and solderable material is introduced between the discs and the discs are interconnected by soldering, preferably by means of a plurality of spot-like soldered joints (11), with said intermediate layer (4) serving as the solder. (FIG. 2).

10 Claims, 1 Drawing Sheet

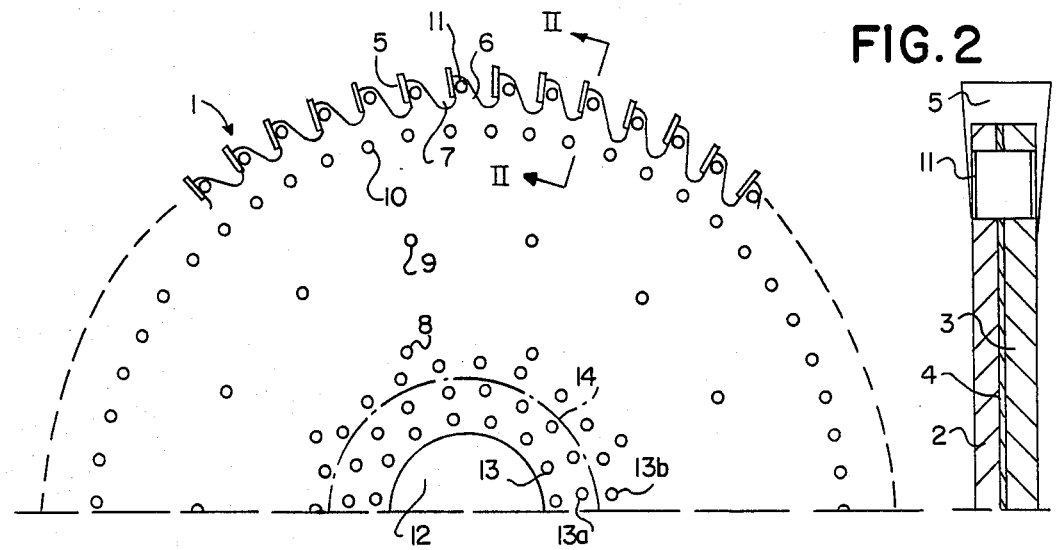
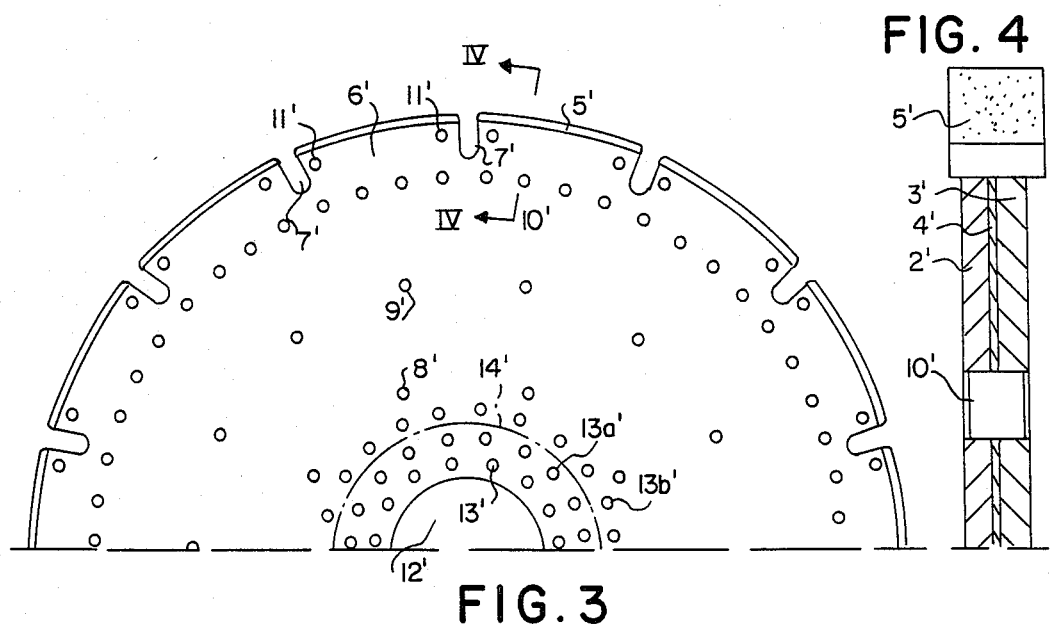

CIRCULAR SAW BLADE

CROSS REFERENCE TO RELATED APPLICATIONS

This is a continuation of application Ser. No. 209,072, filed Mar. 28, 1980 now abandoned.

TECHNICAL FIELD

This invention relates to noise or vibration damping circular saw blades of the type comprising two interconnected discs which preferably consist of steel and on the periphery of which the cutting elements of the blade are attachable.

DISCLOSURE OF THE INVENTION

The object of the invention is to attain, by simple means, an efficient damping of vibrations in the blade and thus a noise suppression when the blade is in operation. According to the invention this is achieved by the fact that at least one intermediate layer or core made of energy-absorbing and solderable material is introduced between said discs and that the interconnection of the discs is provided by soldering with said intermediate layer serving as the solder.

BRIEF DESCRIPTION OF DRAWING

With reference to the accompanying drawing two embodiments of the invention will be described in detail hereinafter.

In the drawing;

FIG. 1 is a side view of part of a hard metal saw blade according to the invention;

FIG. 2 is an enlarged section II—II in FIG. 1;

FIG. 3 is a side view of part of a diamond saw blade; and

FIG. 4 is an enlarged section IV—IV in FIG. 3.

BEST MODE OF CARRYING OUT THE INVENTION

The saw blade 1 shown in FIGS. 1 and 2 comprises two steel discs 2, 3 of different thickness between which an intermediate layer 4 made of an energy-absorbing and solderable material is provided. Preferably said material may also be heat conducting. In practice, said layer 4 may consist of copper or a copper-base alloy, such as brass, bronze, copper-manganese-aluminium, copper-tin-manganese-aluminium or the like. In this case the intermediate layer is illustrated as a lamination or metal sheet which is thin in comparison with the steel discs and which, as best shown in FIGS. 2 and 4, is solid. It is also of a uniform thickness in order to parallelize said discs 2, 3. The intermediate layer may also take the shape of a net of substantially uniform thickness.

Cutting elements in the shape of hard metal or sintered carbide bits or elements 5 are attached to the periphery of the blade. More specifically, each single element is attached to a projection 6 which in this case is relatively slender and which on both sides is defined by slots or recesses designated 7. The attachment of elements 5 to the projections 6 is carried out by using special soldering methods.

According to the invention the steel discs 2, 3 are interconnected by soldering. More specifically they are interconnected by a plurality of spot-like soldered joints located in a special pattern. In this particular case, the blade, in addition to two sets of centrally located soldered spots 8, 9 which interconnect the middle portions of the discs, comprises a first set of peripherically located soldered spots 10, which are disposed comparatively close to each other so as to ensure a solid interconnection of the discs in the vicinity of the projections 6, as well as a second set of soldered spots 11 in the shape of individual soldered spots in the vicinity of each of the outermost portions of the projections 6. The purpose of these soldered spots 11 is to avoid separation of the circumferential portions or projections of the discs 2, 3 if and when a cutting element 5 would get loose due to overloading. Where appropriate, the soldered spots 11 may be spared and replaced for instance by a silver solder.

An aperture 12 is provided in the centre of the blade 1 and intended to receive a shaft or rotatable part, the object of which is to support the blade. Adjacent said shaft aperture 12, there is provided a set of soldered spots 13 which, similar to the soldered spots 10, are located comparatively close to each other to provide a strong interconnection of the discs 2, 3 also in the vicinity of the aperture 12.

It frequently happens that a customer buying a saw blade desires to attach the same onto a shaft having a larger diameter than the diameter of the minimum aperture 12 illustrated with a full line in the drawing. This is simply carried out by stamping a larger aperture in the blade and said larger aperture is illustrated with the dashed line 14 in the drawing. In order to always ensure a strong interconnection of the discs 2, 3 also about such a widened shaft aperture, two or more additional, circular and concentric sets of soldered spots 13a, 13b, etc. located closely to each other are provided. These sets of soldered spots 13, 13a, 13b, etc. may be located at predetermined radial distances, e.g. 50, 60, 70 mm, from the centre of the blade. In this way, the shaft aperture 12 may be e.g. stamping be widened from a radius of 45 mm to 55 mm or 65 mm while maintaining a radially outwardly located rim of soldered spots located closely adjacent to each other.

In the course of the production of the blade, the two steel discs 2, 3 as well as the energy-absorbing intermediate lamination 4 may advantageously be given an optimal internal strain or pre-stress which will render the various layers absolutely plane or parallel and thereby provide an optimal vibration and noise damping effect when the blade is in operation at its normal speed. To the vibration damping effect also the location of the soldered spots 8, 9 contributes. The location of said spots is carefully tested in accordance with a special method, the pattern of the spots being substantially unsymmetrical.

FIGS. 3 and 4 show an alternative embodiment in which the spacing of the slots 7' and thus the peripherical length of the projections 6' is considerably greater than in the preceding case, the sintered carbide bits 5 here being replaced by relatively long, curved cutting elements 5' in the form of diamond segments of conventional type. As in the preceding case the blade has two inner sets of soldered spots 8', 9', a first peripheral set of soldered spots 10' and a second set of soldered spots 11', two of which are placed in each projection 6', and more specifically one spot at each of the ends of said projection.

At the centre of the blade there is also provided three sets of closely located soldered spots 13', 13a' and 13b' of the kind previously described.

Each of the sets of soldered spots previously described may be provided in a circular pattern.

We claim:

1. Circular saw blade of the type having at least two interconnected discs said blade comprising at least one intermediate layer of energy-absorbing metal in the form of a solid sheet of uniform thickness arranged between said discs and that the interconnection of the discs is provided by a plurality of spot-like soldered joints with said intermediate layer serving as the solder.

2. Saw blade according to claim 1 characterized in that it, in addition to one or more sets of centrally located soldered spots which interconnect the central portions of said discs comprise at least one set of peripherally located soldered spots which are disposed comparatively close to each other so as to ensure a solid interconnection of the discs in the vicinity of periphery of the blade.

3. Saw blade according to claim 2, wherein said discs include a plurality of peripheral tooth support projections characterized in that said peripheral sets of soldered spots is substantially circular and disposed in close vicinity to recesses defined between adjacent projections for the cutting elements, each of said projections further having at least one soldered spot located in close vicinity to the outermost peripheral portion of each said projection.

4. Saw blade according to claim 1, characterized in that the blade near its center has at least two sets of generally concentrically and closely arranged soldered spots, which enable the provision of a central aperture of varying diameter while maintaining at least one set of such soldered spots adjacent and about said aperture.

5. Circular saw blade of the type comprising at least two interconnected discs, characterized in that at least one intermediate layer of energy-absorbing and solderable material in the form of a solid metal sheet of uniform thickness is arranged between said discs and that the interconnection of the discs is provided by soldering with said intermediate layer serving as the solder;
    wherein said discs include a plurality of tooth support projections;
    wherein the discs are interconnected by a plurality of spot-like soldered joints; and
    wherein said spot-like soldered joints comprise a peripheral set of soldered spots substantially circular and disposed in close vicinity to recesses defined by adjacent projections for the cutting elements, each of said projections further having at least one soldered spot located in close vicinity to the outermost peripheral portions of said projections.

6. Circular saw blade of the type comprising at least two interconnected discs, characterized in that at least one intermediate layer of energy-absorbing and solderable material in the form of a solid metal sheet of uniform thickness is arranged between said discs and that the interconnection of the discs is provided by soldering with said intermediate layer serving as the solder; and
    wherein the discs are interconnected by a plurality of spot-like soldered joints; and
    wherein the blade near its center has at least two sets of substantially concentrically and closely arranged soldered spots, which enable the provision of a central aperture of varying diameter while maintaining at least one set of such soldered spots adjacent and about said aperture.

7. A circular saw blade as defined in claim 1 and wherein said plurality of spot-like soldered joints is arranged in a substantially asymmetrical pattern.

8. The invention as described in claim 1, wherein said metal intermediate layer is made of copper.

9. The invention as described in claim 1, wherein said metal intermediate layer is made of copper-based alloy.

10. The invention as described in claim 1, wherein the width of said intermediate layer is thinner than the width of at least one of said discs.

* * * * *